United States Patent

[11] 3,591,836

[72] Inventors Robert K. Booher
Mission Viejo;
Robert W. Polkinghorn, Huntington Beach,
both of, Calif.
[21] Appl. No. 804,171
[22] Filed Mar. 4, 1969
[45] Patented July 6, 1971
[73] Assignee North American Rockwell Corporation

[54] FIELD EFFECT CONDITIONALLY SWITCHED CAPACITOR

5 Claims, 3 Drawing Figs.

[52] U.S. Cl. 317/231, 317/235
[51] Int. Cl. H01l 19/00
[50] Field of Search 317/234, 235, 231

[56] References Cited

UNITED STATES PATENTS

| | | | |
|---|---|---|---|
| 3,102,230 | 8/1963 | Kahng | 317/235 X |
| 3,206,670 | 9/1965 | Atalla | 317/235 X |
| 3,383,569 | 5/1968 | Luscher | 317/235 |
| 3,411,053 | 11/1968 | Wiesner | 317/235 |

*Primary Examiner*—James D. Kallam
*Attorneys*—William R. Lane, L. Lee Humphries and Robert G. Rogers

ABSTRACT: The semiconductor substrate area under a metal plate is induced to change from one type of conductivity to a different type of conductivity when a voltage in excess of the inversion threshold of the substrate is applied to the plate. A capacitor is produced which stores a charge proportional to the applied voltage between the metal plate and the induced region. The induced region is connected to an input electrode. When a voltage is applied to the input electrode the voltage on the fixed plate of the capacitor is boosted by an amount proportional to the applied voltage. When the voltage on the metal plate is reduced below the inversion threshold voltage the induced region reverts back to its original conductivity and the input electrode is isolated from the capacitor.

INVENTORS
ROBERT W. POLKINGHORN
ROBERT K. BOOHER
BY
Robert G. Rogers
ATTORNEY

INVENTORS
ROBERT W. POLKINGHORN
ROBERT K. BOOHER
BY Robert G. Rogers
ATTORNEY

FIELD EFFECT CONDITIONALLY SWITCHED CAPACITOR

BACKGROUND OF THE INVENTION

1. Field of the Invention

The invention relates to a field effect capacitor which switches its capacitance between a substrate and an input electrode as a function of an applied voltage and more particularly to a capacitor having fixed plate and another plate produced by inducing a conductivity change in the semiconductor region covered by the fixed plate.

2. Description of Prior Art

It is often useful in field effect circuits to conditionally boost the voltage on the control electrode of a field effect device as a function of the original control electrode voltage. For example, if the gate voltage on a P channel MOS device is negative, it is desirable to make it more negative for drive purposes. However, if the gate is connected to a ground level, it should remain at ground. A device is required which can switch between ground and an input voltage as a function of the original gate voltage. The substrate in which the MOS device are formed is ordinarily referenced to ground.

The present invention describes a device which uses the switchable characteristics of surface inversion as occurs in the channel of field effect transistors to produce a capacitor as a function of a voltage applied to a fixed plate of the capacitor. By changing the applied voltage, the capacitance can be switched between ground an an input electrode connected to a source of voltage for boosting the voltage on the gate electrode.

SUMMARY OF THE INVENTION

Briefly, the invention is a voltage boosting circuit using a capacitor which has its capacitance switched between an input electrode and a substrate as a function of a voltage applied to the fixed plate of the capacitor. The substrate is usually referenced to ground although it could be referenced to other potentials. The circuit comprises a metal contact and a diffused semiconductor region for implementing the input electrode and a semiconductor region of different conductivity which is contiguous with the diffused region (in the same substrate). The semiconductor region of different conductivity forming one plate of the capacitor is covered by the metal plate which form the fixed plate of the capacitor. A thin insulating layer separates the metal plate and semiconductor region.

When a voltage in excess of the inversion threshold of the substrate is applied to the fixed plate, the conductivity of the covered region is induced to change by surface inversion to the conductivity of the diffused region for forming a capacitor plate switched, or connected, to the input electrode. A charge proportional to the applied voltage is stored between the capacitor plates. When a second voltage is applied to the input electrode, conduction occurs between the semiconductor regions for boosting the voltage on a fixed plate.

Therefore, it is an object of this invention to provide a voltage boosting circuit using a conditionally switchable capacitor.

It is another object of this invention to provide a capacitor in which the capacitance is conditionally switched between an input electrode and the substrate which is integral with a plate of the capacitor, as a function of the voltage applied to the other plate of the capacitor.

Still another object of this invention is to provide a field effect circuit including a capacitor which has a switchable plate conditionally connected to an input electrode of the circuit for boosting the voltage on is unswitched capacitor plate.

It is still a further object of this invention to produce a field effect capacitor having a metal plate which covers a semiconductor region of one conductivity which is contiguous with a semiconductor region of another conductivity and which comprises part of an input electrode.

Still a further object of this invention is to provide a field effect device for switching a capacitor plate between ground and an input electrode of a field effect device as a function of the potential applied to the unswitched plate of the capacitor.

A further object of this invention is to provide a field effect storage capacitor produced as a function of a change in the conductivity of a semiconductor region covered by metal plate of the capacitor.

A further object of this invention is to provide a capacitor which switches its capacitance from a substrate to an input electrode potential as a function of the voltage applied to the fixed plate of the capacitor.

A further object of this invention is to provide a field effect device which includes a voltage boosting capacitor for increasing the drive voltage for field effect devices.

These and other objects of this invention will become more apparent from the description of the drawings, a brief description of which follows.

DESCRIPTION OF THE PREFERRED EMBODIMENTS

Figure 1:
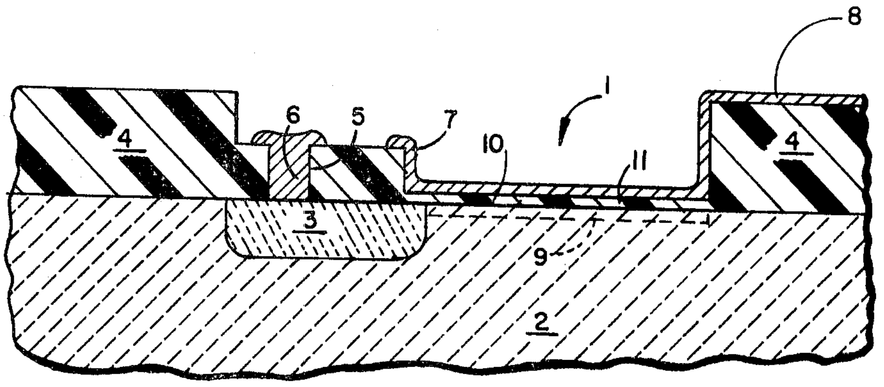
FIG. 1*a* is a cross-sectional view of a voltage boosting circuit having a conditionally switchable capacitor.

FIG. 1 illustrates voltage boosting circuit 1 comprising substrate 2 and region 3 which is disposed within the substrate. The substrate for example may be N-type semiconductor material such as silicon and region 3 may be P-type semiconductor material formed within the substrate by diffusion techniques well-known to persons skilled in the art.

It should be understood that the substrate could be a P-type semiconductor material and that the semiconductor region 3 could be an N-type semiconductor material. The invention is described herein in terms of substrate 2 being N-type material and region 3 being a P-type material. If the semiconductor materials are reversed, voltage polarities must be changed accordingly.

The surfaces of the substrate and region 3 are covered by dielectric layer 4 comprised of an oxide, nitrate, or similar insulating materials well-known in the art. Opening 5 is produced through the dielectric layer 4 to dispose metal contact 6 on region 3 for forming an input electrode for the circuit 1.

Metal plate 7 is disposed over region 10 of the substrate. Region 10 is contiguous with region 3. The metal plate and region 10 are separated by relatively thin dielectric layer 11. The layer of dielectric is relatively thin so that when a voltage in excess of the inversion threshold of the substrate 2 is applied to the plate, surface inversion occurs in region 10 as described subsequently. Conductor 8 which is connected to metal plate 7 provides a conduction path to and from the metal plate.

The metal plate 7, conductor 8, as well as contact 6 may be produced simultaneously by deposition techniques known in the art.

It should be understood that the FIG. 1 cross-sectional view is an illustration of a substantially exaggerated cross section of a semiconductor chip in which perhaps a thousand such circuits may be produced during a single process. For purposes of this description, only one circuit is shown.

When a voltage in excess of the inversion threshold voltage of the substrate material is applied to the metal plate 7 by means of conductor 8, the N-type region 10 covered by the plate 7 is induced to change its conductivity from N-type material to P-type material. The concept of surface inversion which can be used to explain the change in conductivity is known to persons skilled in the art. The depth of the induced P region is shown by the dotted line 9. The combination of the induced region 9 and the metal plate 7 implements a capacitor which stores a charge proportional to the voltage applied through conductor 8 and contact 6.

Subsequently, if a more negative voltage is applied to contact 6, conduction occurs between the diffused P region 3 and the induced P region 9 for boosting the voltage on conductor 8. The boosted voltage can be used, as described subsequently, to boost the drive voltage on the control electrode of a field effect switching device.

If the voltage on conductor 8 is reduced below the inversion threshold voltage of substrate 2, for example, by connecting the conductor to ground, the capacitor is discharged to ground and the induced P region reverts to its normal N-type conductivity. In effect, the capacitance is switched between region 3 and the substrate 2. Normally the substrate is at ground potential. When the capacitance is switched to the substrate, a voltage appearing on the input electrode does not boost the voltage on contact 8.

Figure 2:
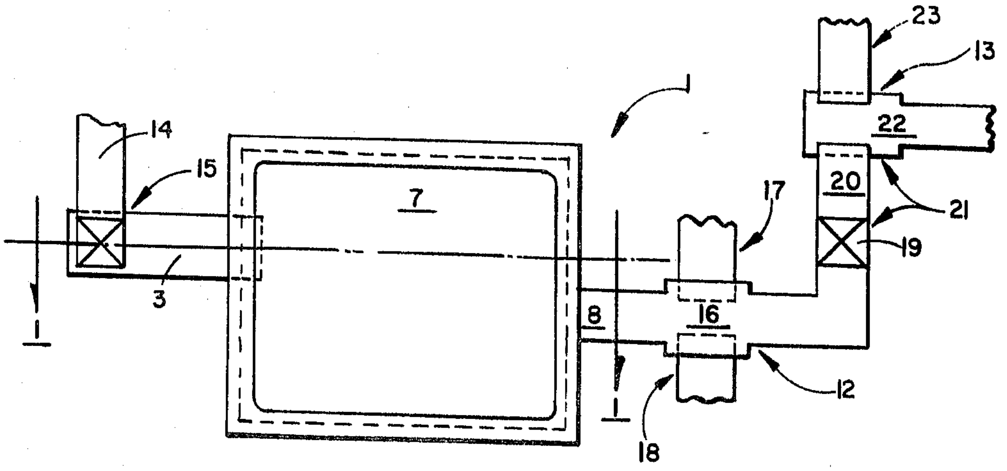
FIG. 2 is a top view of the FIG. 1 circuit used in a gating circuit embodiment.

FIG. 2 illustrates a top view of the FIG. 1 embodiment including MOS devices 12 and 13. All the devices of the circuit are supported by or within substrate 2. Although covered by dielectric layer 4, region 3 and other diffused regions are normally visible through the dielectric layer 4, as shown.

Conductor 14 is shown connected to deposit 6 which with region 3, forms input electrode 15 to circuit 1. Voltage is applied to the input electrode by conductor 14.

Figure 3:
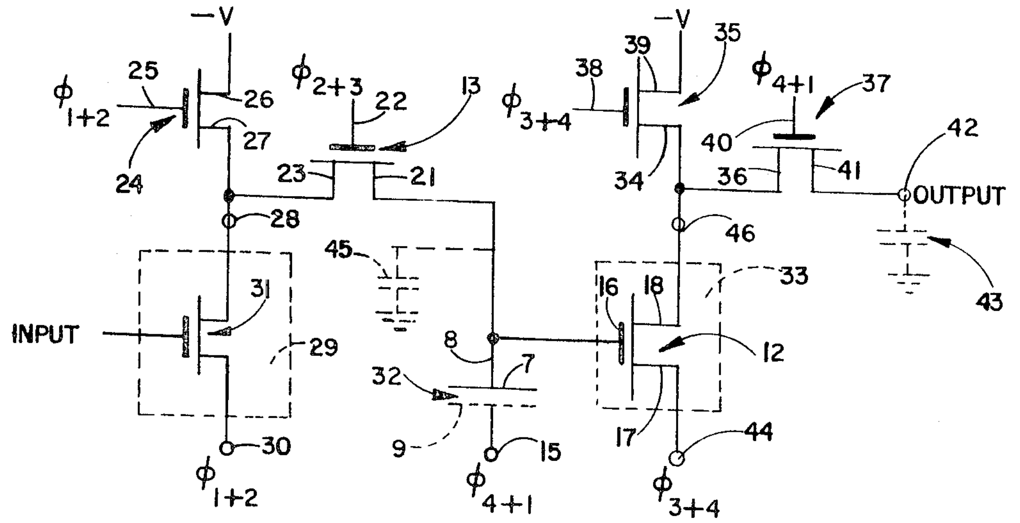
FIG. 3 is a schematic drawing of the FIG. 1 circuit used in a gating circuit embodiment.

Conductor 8 forms gate electrode 16 for MOS device 12. Portions of electrodes 17 and 18 of MOS device 12 are also shown. The metal contacts for the electrodes are not shown, although they are schematically illustrated in FIG. 3. Conductor 8 terminates at area 19 which, with P region 20, forms electrode 21 of MOS device 13. Gate electrode 22 and the P region of the other electrode 23 (not completely shown) are also illustrated.

For purposes of describing the operation of circuit 1, assume a negative voltage is applied to the P region of electrode 23. When device 13 is turned on, substantially the voltage on electrode 23 is applied to plate 7 through conductor 8. If the voltage is greater than the inversion threshold of substrate 2, surface inversion occurs and the N region 10 changes to a P region. If it is less than a threshold, no change occurs. The induced P region forms a capacitor plate which is contiguous with P region 3. A charge proportional to the applied voltage is stored between the fixed plate 7 and switch plate 9. If a voltage is then applied to electrode 15 of the circuit 1 after device 13 is turned off, conduction occurs between region 3 and induced region 9. As a result, the voltage appearing on plate 7 is increases (boosted) by approximately the value of voltage applied to electrode 15 provided the capacitance between plates 7 and 9 is much greater than the inherent capacitance of conductor 8, electrode 16 and electrode 21. Otherwise, the increase in plate voltage is reduced as the inherent capacitance increases relative to the capacitance increases relative to the capacitance between plates 7 and 9.

If the voltage on the metal plate is reduced below the inversion threshold voltage of substrate 2, the induced P region 9 disappears and the capacitance switches from region 3 to the substrate 2. Ordinarily the substrate is connected to ground, although it could be biased to a reference voltage. With the capacitor switched to the substrate, a signal on input electrode 15 does not couple through region 9 to plate 7 and the gate electrode 16 of device 12 remains at approximately ground.

FIG. 3 is a schematic illustration of the FIG. 2 embodiment including additional MOS devices for forming a four-phase gating circuit. The devices of FIG. 2 which also appear in FIG. 3 are similarly numbered. The figure also shows MOS device 24 having its gate electrode 25 connected to multiphase signal $\Phi_{1+2}$ and having one of its other electrodes 26 connected to voltage source −V. Its other electrode 27 is connected to terminal 28 of network 29 implementing a logic function, and to electrode 23 of MOS device 13.

Network 29 includes a second terminal 30 which is connected to multiphase signal $\Phi_{1+2}$. Although the logic function of the network is shown as comprising a single MOS device 31, it should be understood that the embodiment is used to illustrate a simple case. In other embodiments, various combinations of MOS devices may be used to implement different logic functions.

Terminal 28 of the network is also connected to the electrode 23 of MOS device 13 (partially shown in FIG. 1). Gate electrode 22 of the device 13 is connected to a second multiphase signal $\Phi_{1+2}$. Electrode 21 is connected by a conductor 8 to gate electrode 16 of MOS device 12 and to fixed plate 7 of conditionally switched capacitor 32.

Network 33 implements a logic function comprising MOS device 12 having electrode 17 connected to a third multiphase signal $\Phi_{3+4}$ and its other electrode 18 connected to electrode 34 of MOS device 35 and to electrode 36 of MOS device 37. Although the logic function of the network is shown as comprising a single MOS device, it should be understood that the embodiment is used to illustrate a simple case. In other embodiments, various combinations of MOS devices may be used to implement different logic functions.

The gate electrode 38 of MOS device 35 is connected to a third multiphase signal $\Phi_{3+4}$ and electrode 39 of MOS device 35 is connected to voltage source −V. The gate electrode 40 of MOS device 37 is connected to a fourth multiphase signal $\Phi_{4+1}$ and the other electrode 41 of the device is connected to output terminal 42.

The fourth multiphase signal $\Phi_{4+1}$ is also connected to input terminal 15 of conditional capacitor 32. The switchable plate 9 of the capacitor is shown by the dashed line to distinguish the plate from fixed plate 7 shown by the unbroken line.

In operation, during $\Phi_1$ time, MOS device 24 is turned on and the inherent electrode capacitance (not shown) associated with MOS device 31 of network 29, is precharged to approximately −V. Terminal 30 is connected to multiphase signal $\Phi_{1+2}$ so that both terminals of the network 29 are connected to a voltage level during $\Phi_1$ time. For the embodiment shown, it can be assumed that the voltage level of −V and the true (negative) voltage level of the multiphase signals are approximately the same. As a result, a threshold loss occurs through devices 24 and 35.

During $\Phi_2$ time, MOS devices 13, 24 and 29 are turned on to apply approximately the −V voltage (reduced by a threshold) to plate 7 of conditional switched capacitor 32. It is assumed that the voltage is in excess of the inversion threshold voltage of region 10 of substrate 2 (see FIG. 1) so that region 9 is induced to form the second plate of the capacitor. The capacitance of capacitor 32 is therefore switched from the substrate to the input electrode 15 and a charge proportional to the applied voltage is stored between the plate of the capacitor. Inherent capacitance 45 representing the inherent capacitance of conductor 8, electrode 16 and electrode 21 is also charged during $\Phi_2$ time.

Electrode 15 of circuit 1 is connected to a ground voltage level (false) during $\Phi_2$ time since the $\Phi_{4+a}$ signal is false. Since a negative voltage level appears on plate 7 of the capacitor, MOS device 12 is turned on. However, since $\Phi_{3+4}$ is false during the $\Phi_2$ time, and since transistor 37 is turned off during $\Phi_2$ time, circuit operation is not affected.

During $\Phi_3$ time, MOS device 13 remains on since the $\Phi 2_+3$ signal is true, and the state of the logic function represented by a network 29 is evaluated. If it is true, and therefore MOS device 31 is turned on, the ground level represented by the false state of $\Phi_{1+2}$ is applied to plate 7 of conditional capacitor 32. As a result, the capacitor is discharged and the plate 9 established by surface inversion, is switched back to substrate 2. MOS devices 35 also turns on during $\Phi_3$ time since $\Phi 3_+4$ is true so that approximately −V (reduced by a threshold) is applied to terminal 46 of network 33 to precharge the inherent capacitance (not shown) of network 33. The $\Phi 3_+4$ clock signal is also applied to terminal 44 of network 33 during $\Phi_{3+4}$ time.

During $\Phi_4$ time, the inherent capacitance 43 associated with output terminal 42 is unconditionally charged to approximately −V (reduced by a threshold).

During $\Phi_1$ time, the logical state of the logic function implemented by the network 33 is evaluated. MOS device 37 is on and output 42 is conditionally connected to terminal 44 of the network 33 as a function of the state of the logic function represented by MOS device 12. If it is assumed that the logic state of the network 29 had been false during the $\Phi_3$ evaluation time, then the charge on capacitor 32 would have been retained so that plate 9 would have been formed and connected to input terminal 15. Thereafter during $\Phi_4$ time, the voltage on gate electrode 16 of MOS device 12 is boosted by an amount proportional to the $\Phi_{4+1}$ clock signal so that during $\Phi_1$ time, the drive voltage for the device is increased and output terminal 42 is connected to the ground potential on terminal 44. It is pointed out that the voltage on gate 16 increases as a function of the ratio between inherent capacitance 45 and the capacitance of conditionally switched capacitor 32. If capacitor 32 is much larger than capacitance 45, the voltage is increased by approximately the $\Phi_{4+1}$ signal. However, as capacitance 45 increases relative to capacitor 32, the increase in voltage is reduced.

As a result of increasing the drive, or driving the device harder, as it is commonly described, a lower resistance path is established between terminal 42 and terminal 44. Capacitor 43 is discharged more rapidly than it would have been without the increased voltage drive. In addition, the increased voltage compensates for any noise coupled onto gate 16 which might otherwise reduce the voltage on the gate.

If logic function 29 had been true during $\Phi_3$ time, the charge on capacitor 32 would have been discharged. As a result, during $\Phi_1$ time, the output 42 would be unchanged since logic function 33 would be false.

Although the specific embodiments herein are described in terms of MOS transistor devices, it should be understood that other transistor devices such as MNS devices, MNOS devices or other enhancement mode field effect devices could also be used.

While the invention has been described with respect to several physical embodiments constructed in accordance therewith, it will be apparent to those skilled in the art that various modifications and improvements may be made without departing from the scope and spirit of the invention.

It should be pointed out that the size of the capacitance between the fixed plate and the substrate varies as a function of the applied voltage. As a result, it is possible to implement a parametric amplifier using the structure shown in FIG. 1. In that case, after a fixed bias voltage has been applied to plate 7, an AC voltage would be impressed on the plate. Thereafter, another voltage would be applied to the input electrode. As a result of varying the capacitance by the AC voltage, the output on the fixed plate would be amplified.

We claim:

1. A capacitive circuit comprising an input electrode including a semiconductor region of a first conductivity-type semiconductor material in a substrate of a second conductivity-type semiconductor material, a capacitor having a fixed plate disposed over a region of said substrate and insulated therefrom, a second plate comprising an inversion layer in the substrate region subjacent said fixed plate, means for electrically connecting said inversion layer with the semiconductor region of said input electrode for connecting said capacitor in electrical series with said input electrode and producing a proportional increase in the voltage on said fixed plate in response to a voltage applied to said input electrode, and circuit means for applying a voltage to said fixed plate for forming said inversion layer in said substrate.

2. The combination recited in claim 1 including a field effect device having a control electrode connected to said fixed plate for turning said device on relatively hard in response to the voltage on said fixed plate including the increased voltage whereby the effective resistance of the device is reduced.

3. A capacitive circuit comprising an input electrode including a semiconductor region of a first conductivity-type semiconductor material in a substrate of a different conductivity-type semiconductor material, a capacitor having a fixed plate disposed over a region of the substrate and insulated therefrom, a second plate comprising an inversion layer in the substrate region subjacent said fixed plate, means for electrically connecting said inversion layer with the semiconductor region of said input electrode for connecting said capacitor in electrical series with said input electrode and producing a proportional increase in the voltage on said fixed plate and producing a proportional increase in the voltage on said fixed plate in response to a voltage applied to said input electrode, said capacitive circuit including means for operating in a clocking sequence of multiple phase signals, means for applying a first voltage to said fixed plate during one interval of said multiple phase signals, said voltage having a magnitude for inducing a change in the substrate region subjacent said fixed plate for forming said inversion layer having electrical characteristics substantially equivalent to the semiconductor region of said input electrode;

logic function means connected to said fixed plate during a second interval of said multiple phase signals;

means for conditionally connecting said fixed plate to electrical ground during said second interval of said multiple phase signals as a function of the logic state of said logic function; and means for applying a second voltage to said input electrode during a third interval of said multiple phase signals for boosting the voltage on said plate as a function of the logic condition of said logic function during said second interval.

4. The combination recited in claim 3 including a field effect device having a control electrode, wherein said fixed plate is connected to said control electrode for turning said device on in response to said applied voltages.

5. A field effect circuit having semiconductor regions in a substrate, said circuit comprising a capacitor including metal plate means disposed over a semiconductor region of one conductivity type in said substrate having the same conductivity as said semiconductor region;

circuit means for inverting said semiconductor region for forming a second plate of the capacitor; and a semiconductor region of a different conductivity type in said substrate, an electrical contact on said region of different conductivity type for providing voltage levels thereto, said region being contiguous with the inverted semiconductor region, means for electrically connecting said inverted semiconductor region with said semiconductor region of a different conductivity type only without directly connecting said semiconductor region of a different conductivity type electrically with other semiconductor regions of said difference conductivity type and for producing a proportional increase in the voltage on said metal plate in response to a voltage level applied to said semiconductor region of different conductivity type.